2,898,223
PROCESS FOR PREPARING COATED MINERAL AGGREGATE

Robert S. Detrick, Pittsburgh, Pa., assignor to Koppers Company, Inc., a corporation of Delaware No Drawing. Application April 5, 1956
Serial No. 576,251

2 Claims. (Cl. 106—219)

This invention relates in general to improvements of a known process for preparing coated mineral aggregate. More specifically this invention is directed to the improvement of a process in which mineral aggregate having an acid character or nature is first coated with a water-in-oil emulsion of aqueous alkali and tar and thereafter cooled with an oil-in-water emulsion of asphalt emulsified in an aqueous phase, the improvement comprising incorporating in the first coating material a small amount of a water soluble salt of barium or strontium, e.g., barium chloride, whereby an improved bond is obtained between the mineral aggregate and the tar film or layer deposited as a first coat from the water-in-oil emulsion, and premature failure of this bond is obviated.

Heretofore many materials for surfacing roads have been composed of highly siliceous mineral aggregate such as fine gravel, crushed stone, or other mineral rich in silica which form the structure thereof and which are bound together with a bituminous binder. While these materials have shown good properties in several respects, certain problems have arisen in connection with their preparation and with the storage of the prepared coated aggregate. For example, it has often been very difficult to obtain an effective or complete coating of the siliceous aggregate. Further water causes the removing or "stripping" of the bitumen from the aggregate when the coated aggregate is stockpiled or stored for prolonged periods of time. Highly siliceous mineral aggregates such as silica and silica containing gravel and stones possess a negative surface charge. These aggregates are hydrophilic in nature and any water which penetrates the coating will preferentially cover the surface of the aggregate resulting in the aforesaid undesirable results. Heretofore calcium oxide, lime and limestone dust have been added by the trade to bituminous coatings to reverse the surface charge on the surface of the mineral aggregate by adsorption of the two-valent calcium ions on the aggregate's surface.

One road surfacing material which exhibits excellent properties in many respects has been prepared in the past by mixing a mineral aggregate such as a finely-divided gravel, without heating, with a first binder (hereinafter referred to as Binder I) containing a water-in-oil emulsion of alkaline caustic lye with tar, e.g., coke oven tar, water gas tar, wood tar or the like, and thereafter further mixing, without heating, the thus-coated aggregate with a second binder (hereinafter referred to as Binder II), containing an oil-in-water emulsion of asphalt, e.g., oil asphalt or natural asphalt emulsified in an aqueous phase.

This road surfacing material is the subject matter of U.S. Patent 2,498,862 entitled "Coated Mineral Aggregate and Method of Making Same," issued February 28, 1950. Heretofore calcium chloride has been added to this first binder or Binder I to reverse the surface charge on the surface of the finely-divided silica gravel or other aggregate. However in the presence of the strong caustic present in this Binder I, calcium chloride is converted to the hydroxide which is only slightly soluble in aqueous caustic solution. As a result of this conversion only a very low concentration of the two-valent calcium ion is present in this first binder to be adsorbed on the surface of the silica. Consequently this road surfacing material exhibits the aforesaid undesirable properties of the water, which preferentially covers the surface of the aggregate, removing or "stripping" the tar film or layer, which is deposited on the aggregate from the first binder, from the surface of the aggregate when this coated aggregate is stored in piles for substantial periods of time.

In accordance with the present invention, it has now been found that by incorporating a small amount of a water soluble salt of a metal of the group consisting of barium and strontium, into this previously-discussed first binder or Binder I prior to mixing the silica gravel or other mineral aggregate therewith, a coated mineral aggregate is obtained which exhibits an improved bond of excellent strength between the surface of the aggregate and the tar layer deposited from Binder I. The mineral aggregate is then mixed with this Binder I containing the added water soluble salt of a metal of the group consisting of barium and strontium and the thus-coated aggregate is thereafter mixed with the previously-discussed second binder composition or Binder II. Premature failure of this bond by "stripping" by water is thereby overcome and this so treated mineral aggregate is effectively and completely coated during the coating operation.

The water soluble salt of a metal of the group consisting of barium and strontium, which is hereinafter-described, is utilized in the Binder I composition in amount sufficient to prevent premature failure of the bond, as a result of stripping by water, between the tar layer or film deposited from this Binder I and the surface of the mineral aggregate. Broadly, advantageously from about 0.5% to about 5% by weight of the foregoing water soluble salt, based on the weight of the Binder I composition, is employed in this Binder I composition.

Examples of water soluble salts of barium or strontium that can be employed herein are barium chloride, barium formate, barium acetate, barium propionate, barium chlorate, barium iodide, barium nitrate, strontium chloride, strontium bromide, strontium formate, strontium acetate, strontium chlorate, strontium iodide, strontium nitrate and other water soluble salts of barium and strontium. Barium chloride is preferred.

The Binder I composition advantageously can be composed of from about 65% to about 75% by weight of tar, from about 15% to about 25% by weight of aqueous caustic solution, advantageously containing from about 23% to about 33% by weight of anhydrous NaOH (or other alkaline lye), and as is hereinbeforestated, from about 0.5% by weight to about 5% by weight, preferably from about 0.9% to about 2%, of the previously-described water soluble salt of barium or strontium.

An optimum anhydrous NaOH or caustic concentration in the aqueous caustic solution is about 27%. It has been found that this concentration results in a decreased breaking time of the Binder II emulsion during the coating operation. A small or minor amount of a primary amine emulsifying agent or other surface active material can be advantageously utilized in this Binder I composition, if desired. Further fillers such as talc, slate dust, powdered limestone, powdered coal, etc., can be added to the tar, if desired.

The following examples are illustrative of the Binder I composition of the instant invention and are in no way restrictive. The percentages given are by weight:

Example I

| | Percent |
|---|---|
| Coke oven tar | 70.1 |
| Sodium hydroxide aqueous solution of 27% concentration (based on anhydrous NaOH) | 22 |
| Barium chloride aqueous solution of 27% concentration (based on anhydrous barium chloride) | 5.6 |
| Coal tar distillate boiling from about 175° to about 240° C. and containing tar acids and tar bases | 1.5 |
| Armeen T | 0.8 |

Example II

| | Percent |
|---|---|
| Coke oven tar | 71 |
| Sodium hydroxide aqueous solution of 26% concentration (based on anhydrous NaOH) | 22.9 |
| Barium chloride aqueous solution of 27.5% concentration (based on anhydrous barium chloride) | 6.1 |

Example III

| | |
|---|---|
| Water gas tar | 69 |
| Potassium hydroxide aqueous solution of 32% concentration (based on anhydrous KOH) | 25 |
| Barium bromide aqueous solution of 27% concentration (based on anhydrous barium bromide) | 4 |
| Coal tar distillate boiling from about 175° to about 240° C. and containing tar acids and tar bases | 1.4 |
| Armeen T | 0.6 |

Example IV

| | |
|---|---|
| Coke oven tar | 72 |
| Sodium hydroxide aqueous solution of 27.5% concentration (based on anhydrous NaOH) | 20 |
| Barium acetate aqueous solution of 25% concentration (based on anhydrous barium acetate) | 5.4 |
| Coal tar distillate boiling from about 175° to about 240° C. and containing tar acids and tar bases | 1.7 |
| Armeen T | 0.9 |

Example V

| | |
|---|---|
| Coke oven tar | 71 |
| Sodium hydroxide aqueous solution of 31% concentration (based on anhydrous NaOH) | 18 |
| Strontium chloride aqueous solution of 28% concentration (based on anhydrous strontium chloride) | 8 |
| Coal tar distillate boiling from about 175° to about 240° C. and containing tar acids and tar bases | 2.3 |
| Sodium salt of sulfonated castor oil | 0.7 |

Example VI

| | |
|---|---|
| Water gas tar | 70 |
| Potassium hydroxide aqueous solution of 35% concentration (based on anhydrous NaOH) | 19 |
| Strontium chlorate aqueous solution of 27% concentration (based on anhydrous strontium chlorate) | 8 |
| Coal tar distillate boiling from about 175° C. to about 240° C. and containing tar acids and tar bases | 2.1 |
| Calcium salt of sulforisinoleate | 0.9 |

Example VII

| | |
|---|---|
| Coke oven tar | 67 |
| Sodium hydroxide aqueous solution of 27.5% concentration (based on anhydrous NaOH) | 22 |
| Barium chloride aqueous solution of 25% concentration (based on anhydrous barium chloride) | 11 |

Barium propionate, barium chlorate, barium iodide, barium nitrate, strontium bromide, strontium formate, strontium acetate, strontium iodide, strontium nitrate and other water soluble salts of strontium and barium can be utilized, if desired, in foregoing Examples I to VII in place of the water soluble salts of strontium and barium of these examples and with good results.

The composition of Example I has been found to be particularly advantageous for use in this invention.

The "Armeen T" of the foregoing examples is a primary amine surface active composition produced by Armour and Company. "Armeen T" is a mixture of chiefly octadecenylamine with slightly smaller quantities of hexadecylamine and octadecylamine. Other surface active agents that can be utilized in place of the "Armeen T" is "Oronite No. 3," which is the sodium salt of a petroleum sulfonate, the sodium salt of sulfonated castor oil, and the calcium salt of sulforicinoleate.

The coal tar distillate boiling from about 175 to about 240° C. and containing tar acids and tar bases of the foregoing examples is advantageously employed herein, if desired, as a vehicle for getting or transferring the "Armeen T" or other surface active agent into the tar of the resulting water-in-oil emulsion. This distillate can be either a naphthalene drain oil obtained by cooling a coal-tar fraction containing naphthalene to give a precipitate of crystalline naphthalene, which is then separated from the oil by a centrifuge or filter, all in the conventional and known manner; or this vehicle may be a methyl naphthalene fraction separately recovered during the fractional distillation of a naphthalene-containing coal-tar distillate. In any event this coat-tar distillate is sufficiently free of naphthalene to be a liquid at room temperature. This coal-tar distillate contains tar acids and tar bases in addition to the unsaturated hydrocarbons and sulfur compounds also normally contained therein.

The mineral aggregate is coated with Binder I in cold application of thoroughly mixing these two ingredients in any suitable and conventional mixing device.

The amount of Binder I required to produce the first improved coating in a suitable manner varies in accordance with the granulometry of the finely-divided or light gravel, stone or other mineral aggregate, the geological nature and origin of this aggregate, and the season of the year. An amount of Binder I should be employed so that, after thorough mixing of the aggregate and this binder, these materials exhibit a very uniform shiny black appearance. A suitable proportion is 33 to 66 pounds of Binder I per ton of mineral aggregate.

The thus first-coated aggregate is then thoroughly mixed also by cold application with the Binder II. This Binder II can be broadly composed of from about 50% to about 60% by weight of asphalt, such as oil asphalt or natural asphalt, advantageously from about 0.5 to about 1% of surface active agent, such as a mixture of oleic acid, stearic acid and rosin soaps, advantageously from about 0.1 to about 0.5% by weight sodium carbonate, and the balance sufficient to make up 100% of water.

The following examples are illustrative of the Binder II composition of this invention and are in no way restrictive. The percentages recited are by weight:

Example VIII

| | Percent |
|---|---|
| Oil asphalt | 55 |
| Mixture of stearic acid, oleic acid and rosin soap | 0.8 |
| Sodium carbonate | 0.3 |
| Water | 43.9 |

Example IX

| | |
|---|---|
| Natural asphalt | 50 |
| Mixture of stearic acid, oleic acid and rosin soap | 0.9 |
| Sodium carbonate | 0.2 |
| Water | 48.9 |

Example X

| | |
|---|---|
| Oil asphalt | 57 |
| Mixture of oleic acid and rosin soap | 1.1 |
| Potassium carbonate | 0.5 |
| Water | 41.4 |

The Binder II breaks up progressively during the course of this second coating operation in a fashion such that the asphalt is set free in a uniform manner as a second semi-porous film or layer on the first film or layer of tar already covering the aggregate. Apparently the two-valent barium or strontium ions present in Binder I are adsorbed on the surface of the mineral aggregate and neutralize the negative surface charge present thereon thereby rendering the surface hydrophobic. Consequently water is not attracted by, nor does it preferentially cover the surface of the mineral aggregate, with the resultant hereinbefore-described highly undesirable results.

The quantity of this second binder or Binder II containing asphalt that is utilized also varies according to the granulometry and geological nature of the gravel, the use for which this material is intended, and the season of the year. Good results can be obtained by utilizing 110 to 165 pounds of this Binder II per ton of the mineral aggregate such as finely-divided gravel, stone, etc.

The thus-coated mineral aggregate can be stored in piles or heaps for prolonged periods of time and in all kinds of weather. A light superficial crust is formed on the surface of this pile, and this superficial crust serves to protect the remainder of the pile or heap. It is only necessary to break up this light superficial crust in order to reach the coated aggregate underneath which is in the identical condition it was in at the time the coating operation was effected.

The following Table I presents comparative test data which shows the superiority of utilizing a water soluble salt of barium or strontium in place of the calcium chloride of the prior art in the Binder I composition of this invention. The Binder I composition containing barium chloride, which was tested in the "stripping test" hereinafter-described is substantially identical to the Binder I composition set forth in the foregoing Example I. The compositions containing calcium chloride and strontium chloride respectively that were tested are also substantially identical to the Binder I composition of foregoing Example I except that calcium chloride and strontium chloride are substituted in this composition for barium chloride. The aggregate employed in these comparative tests was Manchester gravel, which is acidic in character. This gravel is mined in the vicinity of Manchester, New Hampshire.

TABLE I

| Salt Added | Wt. Percent of Salt | Percent of Gravel Surface Coated | |
|---|---|---|---|
| | | Initial | Final—After 30 Minutes of Stripping Test |
| CaCl₂ | 0.92 | 95 | 70 |
| SrCl₂ | 1.4 | 95 | 80 |
| BaCl₂ | 1.4 | 95 | 90 |
| BaCl₂ | 0.5 | 95 | 80 |
| BaCl₂ | 2.0 | 97 | 93 |
| SrCl₂ | 2.0 | 97 | 85 |

In carrying out the "stripping test" the coated gravel is permitted to stand for at least five minutes to allow excess water to drain away from it. Then 450 grams of this coated gravel are weighed into a cylindrical quart size Mason jar, and allowed to stand in the jar for a period of 18–22 hours to age or cure. Thereafter 350 ml. of distilled water which is at room temperature is added to the jar. The jar is tightly sealed and rotated along its horizontal axis on 2 rubber rollers, which are set slightly apart, at a speed of 160 r.p.m. for a period of 30 minutes. One of these rollers is power driven while the other is an idler roller. After rolling for 30 minutes, during which time the coated gravel has tumbled about in the water, the water phase is drained from the coated aggregate and the latter is visually inspected to determine the percent or degree of "stripping" that has occurred. As is readily apparent from the foregoing Table I, the gravel coated with the Binder I composition containing barium chloride and the gravel coated with the Binder I composition containing strontium chloride had considerably less tar film "stripped" or removed from the surface of this gravel after 30 minutes of the "stripping test" than did the gravel coated with the Binder I composition containing calcium chloride.

Comparative test data Table II below also evidences the superiority of the Binder I formulation containing barium chloride over the Binder I formulation containing the conventional calcium chloride. Manchester gravel coated with a Binder I composition containing barium chloride and Manchester gravel coated with a Binder I composition containing calcium chloride were subjected to the previously-described "stripping test." Both of these Binder I compositions were substantially identical to that of foregoing Example I except that calcium chloride was substituted for barium chloride in one of these compositions. The results are as follows:

TABLE II

| Time In Stock Pile, Days | Time Between Removal From Stock Pile and Testing, Days | Percent of Gravel Surface Coated | | | |
|---|---|---|---|---|---|
| | | Binder I Containing Calcium Chloride | | Binder I Containing Barium Chloride | |
| | | Before Stripping Test | After Stripping Test | Before Stripping Test | After Stripping Test |
| 0 | 13 | 100 | 20 | 100 | 84 |
| 30 | 7 | 90 | 55 | 98 | 78 |
| 60 | 35 | 90 | 73 | 93 | 83 |
| 90 | 7 | 88 | 73 | 91 | 83 |

The coated gravel or other mineral aggregate is applied in the conventional manner by spreading this material out, then leveling off, and thereafter rolling this leveled coated mineral aggregate with a road-roller or other suitable rolling means.

What is claimed is:

1. A process for the preparation of a coated mineral aggregate for surfacing roads and the like, which comprises: mixing a mineral aggregate having an acid character, without heating, with a first binder consisting of a water-in-oil emulsion of from about 65% to about 75% by weight of a tar of the group consisting of coke oven tar, gas tar, water gas tar and wood tar, from about 15% to about 25% by weight of alkaline lye of a concentration of from about 23% to about 33% based on anhydrous sodium hydroxide, and from about 0.9% to about 2% by weight of a water soluble salt of a metal of the group consisting of strontium and barium, and thereafter further mixing, without heating, the thus-coated aggregate with a second binder consisting of an oil-in water emulsion of from about 50% to about 60% by weight of asphalt of the group consisting of oil asphalt and natural asphalt, from about 0.5% to about 1% by weight of a mixture of oleic acid, stearic acid and rosin soaps, from about 0.1 to about 0.5% by weight of sodium carbonate, and the balance to make up 100% of water.

2. A process in accordance with claim 1 wherein the first binder contains approximately by weight:

| | Percent |
|---|---|
| Coke oven tar | 70.1 |
| Sodium hydroxide aqueous solution of 27% by weight concentration (based on anhydrous NaOH) | 22 |
| Barium chloride solution of 25% by weight concentration (based on anhydrous BaCl₂) | 5.6 |
| Coal tar distillate boiling from about 175° to about 240° C. and containing tar acids and tar bases | 1.5 |
| Primary amine emulsifying agent | 0.8 |

References Cited in the file of this patent

UNITED STATES PATENTS

| 2,086,581 | Smith | July 13, 1937 |
| 2,313,759 | McCoy | Mar. 16, 1943 |
| 2,331,022 | Garofalo et al. | Oct. 5, 1943 |
| 2,376,447 | Mullin | May 22, 1945 |
| 2,416,134 | Allen | Feb. 18, 1947 |
| 2,468,533 | Worson | Apr. 26, 1949 |
| 2,498,862 | Petitjean | Feb. 28, 1950 |
| 2,773,777 | Alexander et al. | Dec. 11, 1956 |